United States Patent
Lee et al.

(10) Patent No.: US 8,391,800 B2
(45) Date of Patent: Mar. 5, 2013

(54) SIGNAL ACQUISITION APPARATUS AND METHOD FOR DISTRIBUTED COMPRESSIVE SENSING AND JOINT SIGNAL RECOVERY

(75) Inventors: Heung-No Lee, Gwangju (KR); Junho Lee, Gwangju (KR); Sangjun Park, Gwangju (KR)

(73) Assignee: Gwangju Institute of Science and Technology, Buk-gu Gwangju (KR)

( * ) Notice: Subject to any disclaimer, the term of this patent is extended or adjusted under 35 U.S.C. 154(b) by 13 days.

(21) Appl. No.: 13/250,082

(22) Filed: Sep. 30, 2011

(65) Prior Publication Data
US 2012/0083230 A1    Apr. 5, 2012

(30) Foreign Application Priority Data
Oct. 1, 2010 (KR) .................. 10-2010-0096128

(51) Int. Cl.
*H04B 17/00* (2006.01)
*H04W 24/00* (2009.01)
(52) U.S. Cl. .............. 455/67.11; 455/140; 455/423
(58) Field of Classification Search .......... 455/423, 455/67.11, 130, 132, 137, 226.1, 134, 135, 455/140; 702/47, 52, 53, 122
See application file for complete search history.

(56) References Cited

U.S. PATENT DOCUMENTS

| | | | | |
|---|---|---|---|---|
| 5,790,977 A * | 8/1998 | Ezekiel | | 702/122 |
| 6,006,615 A * | 12/1999 | Uttinger | | 73/866 |
| 6,853,934 B2 * | 2/2005 | Nagamatsu | | 702/77 |
| 7,091,902 B2 * | 8/2006 | Liu et al. | | 342/174 |
| 2012/0150493 A1 * | 6/2012 | Casey et al. | | 702/188 |

* cited by examiner

*Primary Examiner* — Sonny Trinh
(74) *Attorney, Agent, or Firm* — Nath, Goldberg & Meyer; Joshua B. Goldberg; Scott C. Langford

(57) ABSTRACT

Disclosed is a multiple sensor system including a plurality of different sensor devices to acquire respective signals sensed from a single signal source, and a signal acquisition apparatus to recover an original signal generated from the signal source. The signal acquisition apparatus recovers the original signal by applying joint recovery, based on characteristics and correlations between the respective sensor devices, to compressive sensing signals independently compressively sensed and transmitted from the respective sensor devices. At this time, a sensing matrix F prearranged with the respective sensor devices and channel information C between the original signal and each sensor device are used for joint recovery.

9 Claims, 3 Drawing Sheets

SIGNAL ACQUISITION APPARATUS AND METHOD FOR DISTRIBUTED COMPRESSIVE SENSING AND JOINT SIGNAL RECOVERY

CROSS-REFERENCE TO RELATED APPLICATION

This application claims the benefit under 35 U.S.A. §119 of Korean Patent Application No. 10-2010-0096128, filed on Oct. 1, 2010 in the Korean Intellectual Property Office, the entirety of which is incorporated herein by reference.

BACKGROUND

1. Technical Field

The present disclosure relates to a signal acquisition apparatus and method for distributed compressive sensing and joint signal recovery. More particularly, the present disclosure relates to a signal acquisition apparatus and method for recovering an original signal from compressive sensing signals acquired by a plurality of sensor devices.

The present disclosure was derived from research as a part of big-jump research (or challenge research) support program of the Ministry of Education, Science and Technology [Project management No. NN05850, Project name: coding theoretic compressive sensing for multiple sensor systems].

2. Description of the Related Art

Multiple sensor systems are systems for observing a physical phenomenon that satisfies a specific purpose using a number of sensors distributed in a certain space. For example, multiple sensor systems include a low-power ecological monitoring system, a marine information gathering system, a low-power wireless surveillance and reconnaissance system, and a multi-view video system.

Such a multiple sensor system can acquire more accurate sensing data than that observed by a single sensor, since many sensors observe a phenomenon occurring in a limited space or having a common feature and gather the respectively acquired sensing data.

However, in view of information theory, there is a limit to the total amount of information owned by an arbitrary sensing object. As such, the multiple sensor system gathers the limited information through various sensors, so that redundant information is likely to occur. That is, there is a high correlation between signals sensed by the sensors, and an 'intra-sensor correlation' may occur within a signal acquired by each sensor or an 'inter-sensor correlation' may occur between the acquired signals.

The successive redundancy of information becomes an important factor that shortens the lifespan of a network. Furthermore, wireless transmission of data having considerable redundancy results in ineffective use of energy accumulated in a battery and causes deterioration in frequency efficiency.

To solve such problems, a joint compressive sensing theory has been proposed. According to the joint compressive sensing theory, compressive sensing signals are subjected to a compression process based on a correlation between signals, whereby limited resources (e.g., energy and a bandwidth) can be efficiently utilized between signals having a high correlation in order to accurately recover an original signal.

However, the conventional joint compressive sensing theory employs the correlation information (inter and intra-sensor correlation information), which is obtained by analyzing signals exchanged between the sensors for a long period of time. Thus, communication between the sensors is needed to obtain the correlation information.

Accordingly, the joint compressive sensing is effective when a distance between sensors is short, but has a problem in that power for transmission/reception is used for signal compression. This acts as significant overhead in light of total power consumption, thereby causing efficiency deterioration.

Moreover, since the respective sensors of the multiple sensor system are basically realized to provide minimum performance, joint compressive sensing is too complicated to be carried out by such small sensors. Accordingly, conventional joint compressive sensing is not a practical alternative due to its low effectiveness.

BRIEF SUMMARY

The present disclosure is directed to providing an apparatus and method for acquiring an original signal without communication between sensors, i.e. through distributed joint recovery based on characteristics and correlation of the sensors.

In accordance with one aspect of the disclosure, a signal acquisition apparatus is provided. The signal acquisition apparatus acquires a signal generated from a certain signal source through a plurality of different sensor devices and recovers an original signal of the signal source. The signal acquisition apparatus includes: a receiving unit which receives respective compressive sensing signals—linearly measured using a sensing matrix randomly selected by a previously defined algorithm and signals respectively acquired by the sensor devices—from the sensor devices; a storage unit which stores the sensing matrix prearranged with the sensor devices and previously acquired channel information between the signal source and the sensor devices; and a recovery unit which recovers the original signal by applying joint recovery, based on the sensing matrix and the channel information, to the respective compressive sensing signals received in the receiving unit.

In accordance with another aspect of the disclosure, a joint recovery method is provided. The method includes: receiving, by a signal acquisition apparatus, compressive sensing signals—linearly measured using respective sensing matrices randomly selected by a previously defined algorithm and signals respectively acquired from one signal source by the sensor devices—from a plurality of different sensor devices; and recovering an original signal generated from the signal source by applying joint recovery, based on the respective sensing matrices prearranged with the sensor devices and previously measured respective channel information between the signal source and the sensor devices, to the respective compressive sensing signals.

BRIEF DESCRIPTION OF THE DRAWINGS

The above and other aspects, features, and advantages of the disclosed subject matter will become apparent from the detailed description of the following embodiments in conjunction with the accompanying drawings, in which.

DETAILED DESCRIPTION

Figure 1:
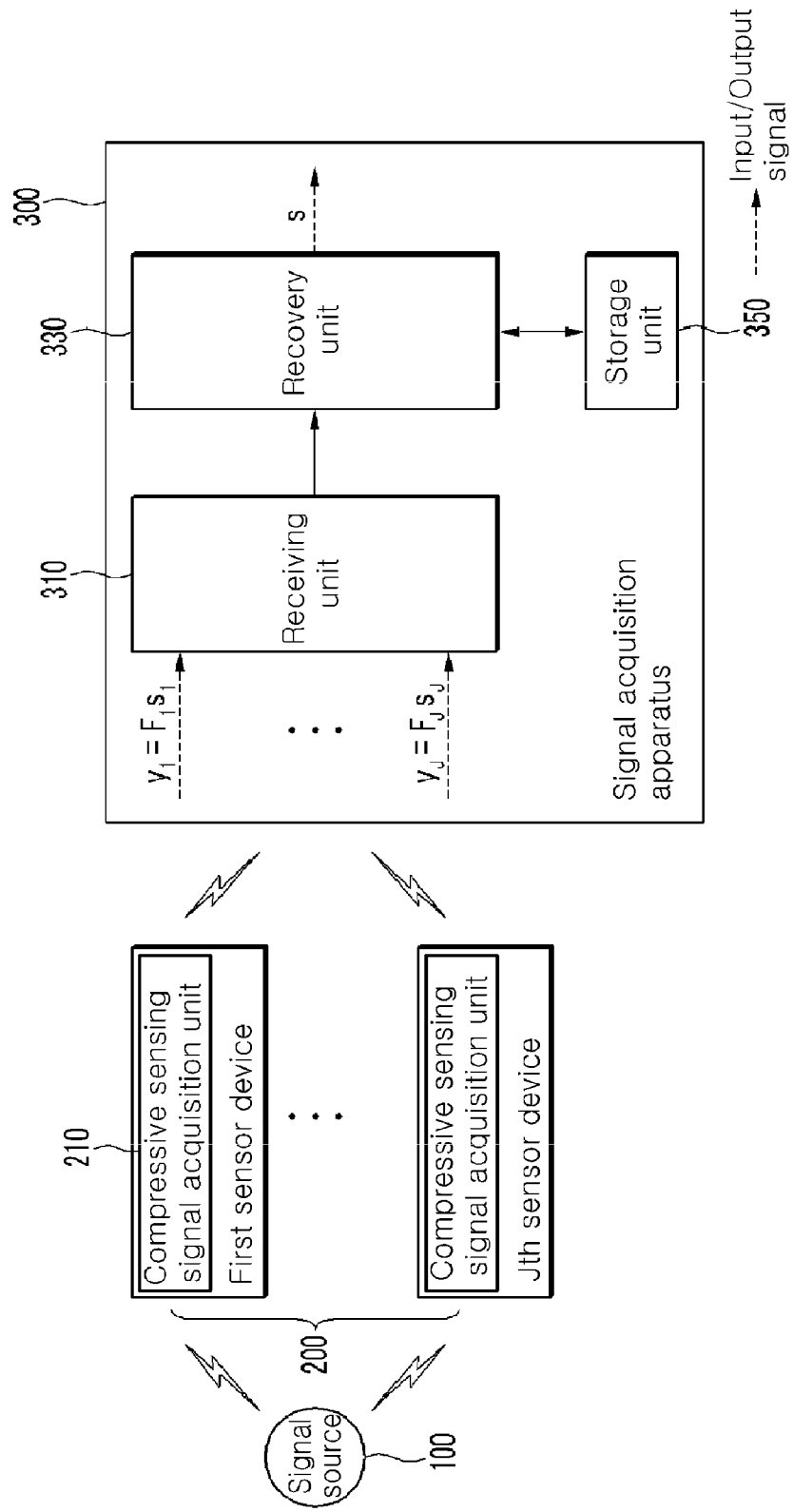
FIG. 1 is a diagram of a multiple sensor system according to an exemplary embodiment.

Exemplary embodiments will now be described in detail with reference to the accompanying drawings. It should be understood that the present disclosure is not limited to the following embodiments and may be embodied in different ways, and that the embodiments are given to provide complete disclosure and to provide thorough understanding of the disclosure to those skilled in the art. Herein, descriptions of details apparent to those skilled in the art will be omitted for clarity. Like components will be denoted by like reference numerals throughout the specification.

In the following description and claims, it should be noted that the terms "include", "have," "comprise" or other derivatives specify the presence of stated features, steps, operations, elements and/or components, but do not preclude the presence or addition of other features, steps, operations, elements and/or components, unless clearly indicated otherwise.

A signal acquisition apparatus and method for recovering an original signal according to exemplary embodiments will now be described with reference to the accompanying drawings.

FIG. 1 is a diagram of a multiple sensor system according to an exemplary embodiment.

Referring to FIG. 1, the multiple sensor system includes a signal acquisition apparatus 300 and a plurality of sensor devices 200 which acquire a signal sensed from a single signal source 100.

The plurality of sensor devices 200 includes j different sensor devices (i.e., a first sensor device, . . . , a Jth sensor device). The plurality of sensor devices 200 wirelessly transmits each compressively sensed signal $y_1(=F_1 s_1)$, . . . , $y_J(=F_J s_J)$, (hereinafter referred to as a 'compressive sensing signal') to the signal acquisition apparatus 300.

Here, each of the sensor devices 200 includes a compressive sensing signal acquisition unit 210. The compressive sensing signal acquisition unit 210 acquires a signal generated from a signal source through a compressive sensing process, in which a signal sensed from the signal source 100 is acquired by each sensor device and a linear measurement signal $y_i$, i=1, . . . , J is acquired using a sensing matrix F randomly selected by a previously defined algorithm. This will be described in detail with reference to Expression 1.

The signal acquisition apparatus 300 may include a receiving unit 310, a recovery unit 330, and a storage unit 350.

The receiving unit 310 receives the compressive signal signals $y_1(=F_1 s_1)$, . . . , $y_J(=F_J s_J)$ from the plurality of sensor devices 200, respectively.

The recovery unit 330 performs joint recovery using the sensing matrix F prearranged with the plurality of sensor devices 200 and channel information C between the signal source 100 and the plural sensor devices 200 to recover an original signal S generated from the signal source 100.

The storage unit 350 stores the sensing matrix F and the preset channel information C. Here, the sensing matrix F is randomly designed by various previously defined algorithms. For example, a matrix including independent identically independent (i.i.d) Gaussian random variables, an average of which is 0 and a variance of which is 1, may be used as the sensing matrix F. Alternatively, a matrix including rows randomly selected from a discrete Fourier transform (DFT) matrix may be used as the sensing matrix F.

The channel information C is information previously acquired through training data, which is a convolution matrix with respect to impulse response between the signal source 100 and the sensor devices 200. The channel information C may be modeled in a finite impulse response (FIR) sequence used for a wireless communication channel having a multi-path.

Next, a serial procedure of performing joint recovery using the sensing matrix F and the channel information C will be described in detail with reference to FIG. 2. Here, like reference numerals refer to elements similar to those of FIG. 1.

Figure 2:
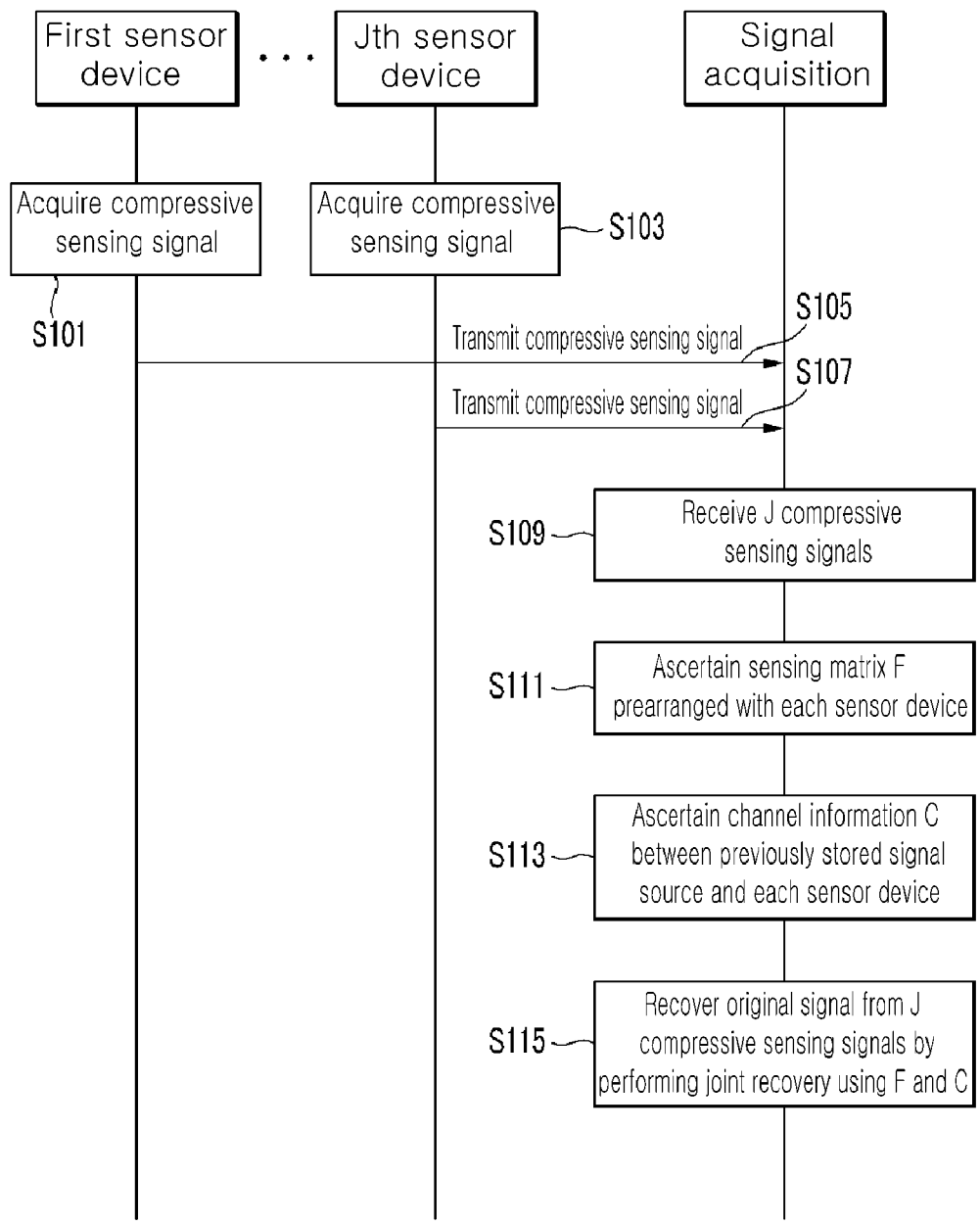
FIG. 2 is a flowchart of a joint recovery method according to an exemplary embodiment.

FIG. 2 is a flowchart of a joint recovery method according to an exemplary embodiment.

Referring to FIG. 2, the plurality of sensor devices 200, i.e., a first sensor device 1, . . . , a Jth sensor device, acquire compressive sensing signals in S101, S103, and transmit the signals to the signal acquisition apparatus 300, respectively, in S105, S107.

Here, the compressive sensing independently performed in each sensor is represented by Expression 1:

$y_1 = F_1 s_1$: signal compressively sensed by the first sensor device

. . .

$y_J = F_J s_J$: signal compressively sensed by the jth sensor device where $y_1, \ldots, y_J$ are a vector of M×1, $F_1, \ldots, F_J$ are a matrix of M×N, $s_1, \ldots, s_J$ are a vector of N×1, and $M \leqq \leqq N$.

Assume that the original signals $s_1, \ldots, s_J$ acquired by the respective sensor devices 200 form a sparse vector having most indexes of 0. Therefore, compressive sensing refers to the process by which a signal sensed from the signal source 100 is linearly measured using $F_1, \ldots, F_J$ and precedent information ($s_1, \ldots, sJ$) that form a sparse vector, and an N-dimensional vector is then represented as an M-dimensional vector.

Meanwhile, the receiving unit 310 of the signal acquisition apparatus 300 receives J compressive sensing signals at S105 and S107 (in S109), and the J compressive sensing signals are represented by Expression 2:

$Y = [y_1^T, y_2^T, \ldots y_J^T] \in R^{JM \times 1}$

If Expression 2 is represented as a determinant, the following expression is obtained:

$$Y = \begin{pmatrix} y_1 \\ y_2 \\ \vdots \\ y_J \end{pmatrix}_{JM \times 1} = \begin{pmatrix} F_1 & & & \\ & F_2 & & \\ & & \ddots & \\ & & & F_J \end{pmatrix}_{JM \times JN} \begin{pmatrix} s_1 \\ s_2 \\ \vdots \\ s_J \end{pmatrix}_{JN \times 1} \quad \text{[Expression 3]}$$

where Y is represented as J vectors of M×1, $F_1, \ldots, F_J$ are represented as a matrix of JM×JN, and $s_1, \ldots, s_J$ are J vectors of N×1. Further, the sensing matrix $F_1, \ldots, F_J$ represented as the matrix of JM×JN is obtained by randomly selecting a matrix having a low correlation between columns. That is, if an operator randomly selects the sensing matrix $F_1, \ldots, F_J$ through a previously defined program and then tests the same to select sensing matrix $F_1, \ldots, F_J$ having a relatively good de-correlation, such selected matrix is stored in the storage unit 350.

At this time, the original signal s generated in the signal source 100 is defined by Expression 4:

$S \in R^N$

Further, the original signals $[S_1^T, S_2^T, \ldots S_J^T]$ measured by J sensor devices are included in common original signals s.

At this time, the recovery unit 330 ascertains the channel information C and the sensing matrix $F_1, \ldots, F_J$ stored in the storage unit 350 in S111, S113.

Here, a set F of sensing matrices of the respective sensor devices 200 is defined by Expression 5:

$F = \text{diag}[F_1, \ldots, F_J] \in R^{JM \times JN}$

The channel information C between each sensor device and the signal source is modeled in a secondary FIR sequence as in Expression 6:

$$C_J = [C_{0,J}, C_{1,J}, C_{2,J}] \quad\quad 6$$

Further, the convolution matrix with respect to the FIR sequence like Expression 6, i.e. the channel matrix $C_J$ between each sensor device and the signal source may be represented by Expression 7:

$$C_J = \begin{pmatrix} C_{0,J} & & & \\ C_{1,J} & C_{0,J} & & \\ C_{2,J} & \ddots & \ddots & \\ & C_{2,J} & C_{1,J} & C_{0,J} \end{pmatrix}$$

Such a set C of channel matrix of each sensor device 200 may be written by Expression 8:

$$C = [C_1; C_2; \ldots; C_J] \in R^{JN \times JN}$$

Then, the recovery unit 330 performs joint recovery using the sensing matrix $F_1, \ldots, F_J$ and the channel information C ascertained in S111 and S113, thereby recovering the original signal s in S115.

That is, the sensing matrix $F_1, \ldots, F_J$ and the channel information $C_1, \ldots, C_J$ can be used in rewriting Expression 3 as the following Expression 9, and thus the recovery unit 330 recovers the original signal $S \in R^N$.

$$Y = \begin{pmatrix} y_1 \\ y_2 \\ \vdots \\ y_J \end{pmatrix}_{JM \times 1} = \begin{pmatrix} F_1 & & & \\ & F_2 & & \\ & & \ddots & \\ & & & F_J \end{pmatrix}_{JM \times JN} \begin{pmatrix} C_1 s \\ C_2 s \\ \vdots \\ C_J s \end{pmatrix}_{JN \times 1} \quad [\text{Expression 9}]$$

$$= \begin{pmatrix} F_1 & & & \\ & F_2 & & \\ & & \ddots & \\ & & & F_J \end{pmatrix}_{JM \times JN} \begin{pmatrix} C_1 \\ C_2 \\ \vdots \\ C_J \end{pmatrix}_{JM \times N} s$$

$$= \begin{pmatrix} F_1 C_1 \\ F_2 C_2 \\ \vdots \\ F_J C_J \end{pmatrix}_{JM \times N} s_{N \times 1}$$

According to Expression 9, $S_1, \ldots, S_J$ of Expression 3 are represented as a multiplication matrix of the respective channel matrices $C_1, \ldots, C_J$ and the original signal S. Further, the multiplication matrix is obtained by multiplication of the common original signal S and JN×N dimensional channel matrices $C_1, \ldots, C_J$. Also, the multiplication matrix is obtained by multiplication of the multiplication matrix between JM×N dimensional matrices, i.e. the channel matrices $C_1, \ldots, C_J$ and the sensing matrices $F_1, \ldots, F_J$, and the common original signal S of a N×1 dimensional vector.

Here, if the JN×N dimensional sensing matrix is defined as $$\begin{pmatrix} F_1 & & & \\ & F_2 & & \\ & & \ddots & \\ & & & F_J \end{pmatrix} = F$$

and the JM×N dimensional channel matrix is defined as $$\begin{pmatrix} C_1 \\ C_2 \\ \vdots \\ C_J \end{pmatrix} = C,$$

Expression 9 is finally written as Expression 10:

$$Y = FCs$$

If Expression 10 is substituted for Expression 1, the sensing matrix is defined as $\tilde{F} = FC$. Therefore, the recovery unit 330 performs the joint recovery using the new sensing matrix $\tilde{F} = FC$.

Since the new sensing matrix $\tilde{F} = FC$ is calculated based on values stored in the storage unit 350, it corresponds to a value known by the recovery unit 330. Therefore, an unknown value to be recovered is a N×1 vectors. Therefore, as compared with Expression 3, the number of unknown values s is decreased from JN to N.

Meanwhile, the recovery unit 330 performs an operation of an optimization problem of $P_1$ in Expression 11 with respect to Expression 10 and recovers the original signal s.

$$(P_1) \min \|\hat{s}\|_1 \text{ subject to } \tilde{F}\hat{s} \quad\quad [\text{Expression 11}]$$

Figure 3:
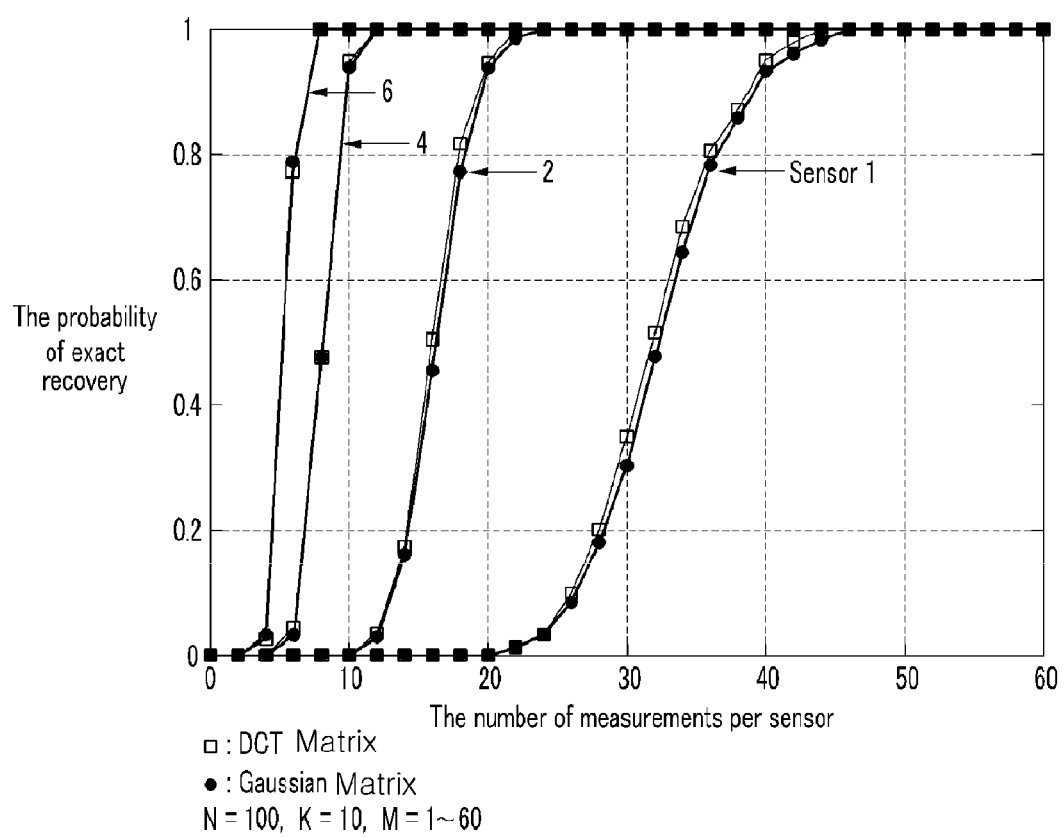
FIG. 3 is a graph of a result of simulating the exemplary embodiment.

FIG. 3 is a graph showing a result of simulating the exemplary embodiment.

Here, indexes other than 0 of a signal δ sensed to show average performance of compressive sensing in the multiple sensor system are always randomly selected. Further, calculation is performed regarding a probability of exact recovery.

As the sensing matrix F used in each sensor, the matrix including independent identically independent (i.i.d) Gaussian random variables, an average of which is 0 and a variance of which is 1, and the matrix including rows randomly selected from the discrete Fourier transform (DFT) matrix are used. Further, the channel matrix C is a secondary finite impulse response (FIR) convolution matrix.

FIG. 3 shows the probability of exact recovery from an original signal with respect to the number of measurements per sensor according to increase or decrease in the number of sensors.

According to simulation results, the number of samples per sensor required for exact recovery of an original signal decreases with increasing number of sensors.

As such, according to embodiments, the signal acquisition apparatus allows respective sensor devices to acquire a signal through independent application of compressive sensing, thereby considerably reducing time and power required for signal processing.

Further, in the signal acquisition apparatus according to the embodiments, the respective sensor devices do not require communication between the sensors, so that they can perform joint recovery based on characteristics and correlation of the sensors while performing their inherent sensing functions only. Further, a sensing matrix F and channel information C between an original signal and each sensor are employed in joint recovery, thereby reducing calculation amount in proportion to sensor number.

Although some embodiments have been described herein, it should be understood by those skilled in the art that these embodiments are given by way of illustration only, and that various modifications, variations, and alterations can be made without departing from the spirit and scope of the invention. Therefore, the scope of the invention should be limited only by the accompanying claims and equivalents thereof.

What is claimed is:

1. A signal acquisition apparatus that acquires a signal generated from a certain signal source through a plurality of different sensor devices and recovers an original signal generated from the signal source, the apparatus comprising:
   a receiving unit which receives respective compressive sensing signals linearly measured using a sensing matrix randomly selected by a previously defined algorithm and signals respectively acquired by the sensor devices from the sensor devices;
   a storage unit which stores the sensing matrix prearranged with the sensor devices and previously acquired channel information between the signal source and the sensor devices; and
   a recovery unit which recovers the original signal by applying joint recovery, based on the sensing matrix and the channel information, to the respective compressive sensing signals received in the receiving unit.

2. The apparatus according to claim 1, wherein the channel information comprises a convolution matrix with respect to impulse response between the signal source and the sensor devices.

3. The apparatus according to claim 2, wherein the convolution matrix is modeled as a finite impulse response sequence.

4. The apparatus according to claim 3, wherein the sensing matrix comprises a matrix having a relatively low correlation between columns among the matrices randomly selected by the previously defined algorithm.

5. The apparatus according to claim 2, wherein the sensing matrix comprises a matrix having a relatively low correlation between columns among the matrices randomly selected by the previously defined algorithm.

6. The apparatus according to claim 1, wherein the sensing matrix comprises a matrix having a relatively low correlation between columns among the matrices randomly selected by the previously defined algorithm.

7. A joint recovery method comprising:
   receiving, by a signal acquisition apparatus, compressive sensing signals from a plurality of different sensor devices, the compressive sensing signals being linearly measured using respective sensing matrices randomly selected by a previously defined algorithm and signals respectively acquired from one signal source by the sensor devices; and
   recovering an original signal generated from the signal source by applying joint recovery, based on the respective sensing matrices prearranged with the sensor devices and previously measured respective channel information between the signal source and the sensor devices, to the respective compressive sensing signals.

8. The method according to claim 7, wherein the respective compressive sensing signals are a determinant obtained by multiplication of the respective sensing matrices and the respective sensing signals, and the recovering comprises performing an operation to acquire the unknown original signal by representing the determinant as multiplication of a matrix and the original signal, the matrix comprising the respective sensing matrices multiplied by the respective channel information.

9. The method according to claim 8, wherein the recovering comprises recovering the original signal by performing an operation of an optimization problem with regard to the determinant.

* * * * *